United States Patent [19]

Giacosa

[11] Patent Number: 4,875,893
[45] Date of Patent: Oct. 24, 1989

[54] CONTINUOUS SPEED VARIATOR WITH EXPANDING PULLEYS

[75] Inventor: Dante Giacosa, Turin, Italy

[73] Assignee: Fiat Auto S.p.A., Turin, Italy

[21] Appl. No.: 248,015

[22] Filed: Sep. 23, 1988

[30] Foreign Application Priority Data

Sep. 23, 1987 [IT] Italy ................................ 67809 A/87

[51] Int. Cl.⁴ ............................................ F16H 11/02
[52] U.S. Cl. .................................................... 474/28
[58] Field of Search ............ 474/28, 8, 11, 12, 16–18, 474/69, 70, 32–34; 74/867–869

[56] References Cited

U.S. PATENT DOCUMENTS 4,484,901 11/1984 Toti et al. .............................. 474/28

FOREIGN PATENT DOCUMENTS 0173653 10/1982 Japan ...................................... 474/28
0845723 8/1960 United Kingdom ................... 474/28

Primary Examiner—Thuy M. Bui
Attorney, Agent, or Firm—Sughrue, Mion, Zinn, Macpeak & Seas

[57] ABSTRACT

A continuous speed variator including two sets of hydraulically-controlled expandable driving-driven pulleys on parallel shafts with respective driving belts arranged in parallel. The movable parts of the driving pulleys are telescopically mounted on a drive shaft and define a common hydraulic actuating chamber.

4 Claims, 2 Drawing Sheets

CONTINUOUS SPEED VARIATOR WITH EXPANDING PULLEYS

BACKGROUND OF THE INVENTION

The present invention relates generally to continuous speed variators with expandable pulleys.

More particularly, the invention concerns a continuous speed variator of the type comprising a driving shaft and a driven shaft carrying an expandable driving pulley and an expandable driven pulley respectively, each formed by a fixed half-pulley and a half-pulley which is movable axially relative to the fixed half-pulley, a driving belt which passes around the expandable driving and driven pulleys, and hydraulic means for causing the displacement of the movable half-pulleys for continuous variation of the transmission ratio.

SUMMARY OF THE INVENTION

The object of the present invention is to produce a continuous speed variator of the aforesaid type, which is suitable for application to very powerful power units, particularly for racing cars, and which has a compact, simple and functional conformation.

According to the invention, this object is achieved by virtue of the fact that the continuous speed variator includes a second expandable driving pulley and a second expandable driven pulley carried by the driving shaft and the driven shaft respectively, beside the said driving and driven pulleys, and around which passes a second driving belt parallel to the said driving belt, and in that the movable half-pulleys of the driving pulley and the second driving pulley are situated between their fixed half-pulleys and form parts of a single expandable and contractible body supported by the driving shaft so that it can slide freely in an axial direction.

The use of a double driving belt enables the field of use of the continuous speed variator with expandable pulleys to be extended to applications for which conventional single-belt variators are inadequate, and particularly for the transmission of high powers, such as those of the power units installed in sports cars.

The conformation of the unit formed by the two driving pulleys, and more particularly the arrangement of the two movable half-pulleys of these driving pulleys in a unit which floats axially on the driving shaft, ensures correct transmission of the drive from the driving shaft to the driven shaft by the two belts in parallel, ensuring self-adjustment of the transmission ratio regardless of the dimensional tolerances of the components of the variator and, in particular, of any slight differences in the length of the two driving belts.

According to an embodiment of the invention which is particularly advantageous in terms on structural simplicity, the movable half-pulleys of the two driving pulleys are coupled to each other telescopically and define an intermediate thrust chamber connected to the hydraulic control means.

According to another aspect of the invention, the driving shaft carries radial stop means for limiting the amount of axial sliding of the expandable and contractible body formed by the movable half-pulleys of the two driving pulleys.

The fixed half-pulleys of the two driven pulleys are preferably situated between their movable half-pulleys and define between these driven pulleys an intermediate axial portion of the driven shaft which is aligned with the expandable and contractible body in a direction parallel to the driving belts and carries a toothed output member of the variator.

With this arrangement, the variator according to the invention has a compact and symmetrical structure which reduces its bulk, facilitating its installation in restricted spaces.

BRIEF DESCRIPTION OF THE DRAWINGS

Further characteristics and advantages of the invention will become clear in the course of the detailed description which follows with reference to the appended drawings, provided purely by way of non-limiting example, in which.

DETAILED DESCRIPTION OF THE INVENTION

Figure 1:
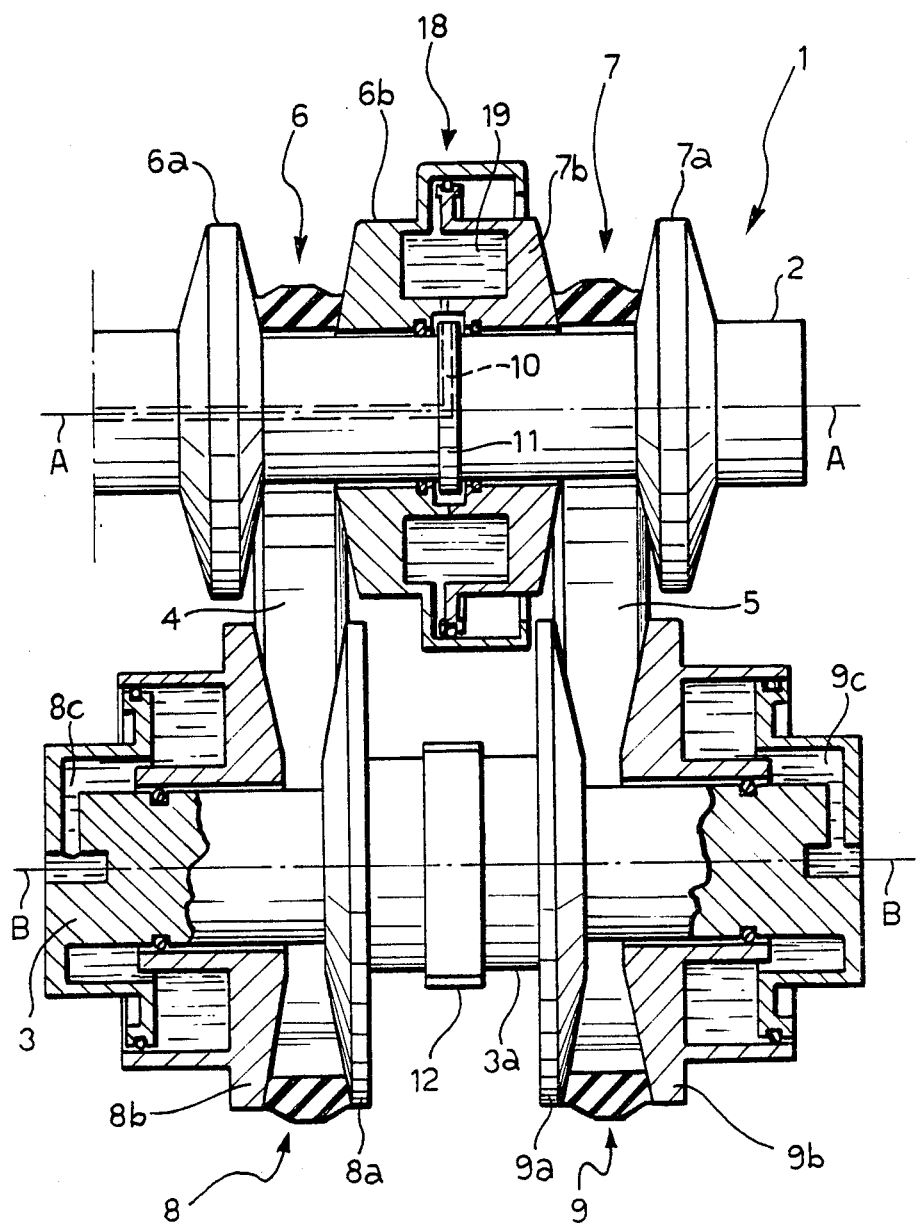
FIG. 1 is a schematic partially-sectioned elevational view of a continuous speed variator with expandable pulleys according to the invention, in a first operative configuration.

With reference to the drawings, a continuous speed variator with expandable pulleys is generally indicated 1 and is intended to be used for the transmission of drive from the power unit to the driving wheels of a motor vehicle.

The variator 1 comprises a driving shaft 2 intended to be rotated by the shaft of the engine, through conventional means not illustrated, and a driven shaft 3 parallel to the driving shaft 2 and intended to be connected, also through conventional means not illustrated, to the drive-shafts of the driving wheels of the vehicle.

The transmission of drive from the driving shaft 2 to the driven shaft 3 is effected, according to the invention, by means of a pair of endless belts 4 and 5, also of conventional type, arranged in parallel and passing around two pairs of expandable driving and driven pulleys 6, 7 and 8, 9 carried by the driving shaft 2 and the driven shaft 3, respectively.

The two driving pulleys 6, 7 each comprise a fixed half-pulley 6a, 7a fixed rigidly to the driving shaft 2 and a movable half-pulley 6b, 7b which can be moved towards or away from the fixed half pulley 6a, 7a along the axis A of the driving shaft 2.

The two movable half-pulleys 6b, 7b are arranged between the fixed half-pulleys 6a, 7a and form parts of a single expandable and contractible body 18 supported by the driving shaft 2 so as to be able to slide freely in an axial direction. In the embodiment shown in the drawings, the movable half-pulleys 6b, 7b are coupled to each other telescopically and define, within the body 18, an intermediate thrust chamber 19 which is hydraulically sealed and connected, by means of a passage 10 formed within the driving shaft 2, to a hydraulic control circuit of conventional type which effects the expansion and contraction of the body 18 and hence, through the movement of the movable half-pulleys 6b, 7b towards or away from the fixed half-pulleys 6a, 7a, the continuous variation of the transmission ratio of the variator 1.

A radial stop carried by the driving shaft 2 in a position intermediate the two fixed half-pulleys 6a, 7a is indicated 11 and has the function of limiting the amount of axial sliding of the body 18 in one direction or in the opposite direction.

The two driven pulleys 8, 9 also comprise a fixed half-pulley 8a, 9a rigidly fixed to the driven shaft 3 and a movable half-pulley 8b, 9b which can be moved towards or away from the respective fixed half-pulley 8a, 9a along the axis B of the driven shaft 3.

The movable half-pulleys 8b, 9b are situated outwardly of the fixed half-pulleys 8a, 9a and are associated with respective thrust chambers 8c, 9c connected in a conventional manner to the hydraulic circuit for controlling the variator.

The two fixed half-pulleys 8a, 9a define a central axial portion 3a of the driven shaft 3 which is aligned with the expandable and contractible body 18 in a direction parallel to the two driving belts 4,5 and carries to toothed output member 12 of the variator.

Figure 2:
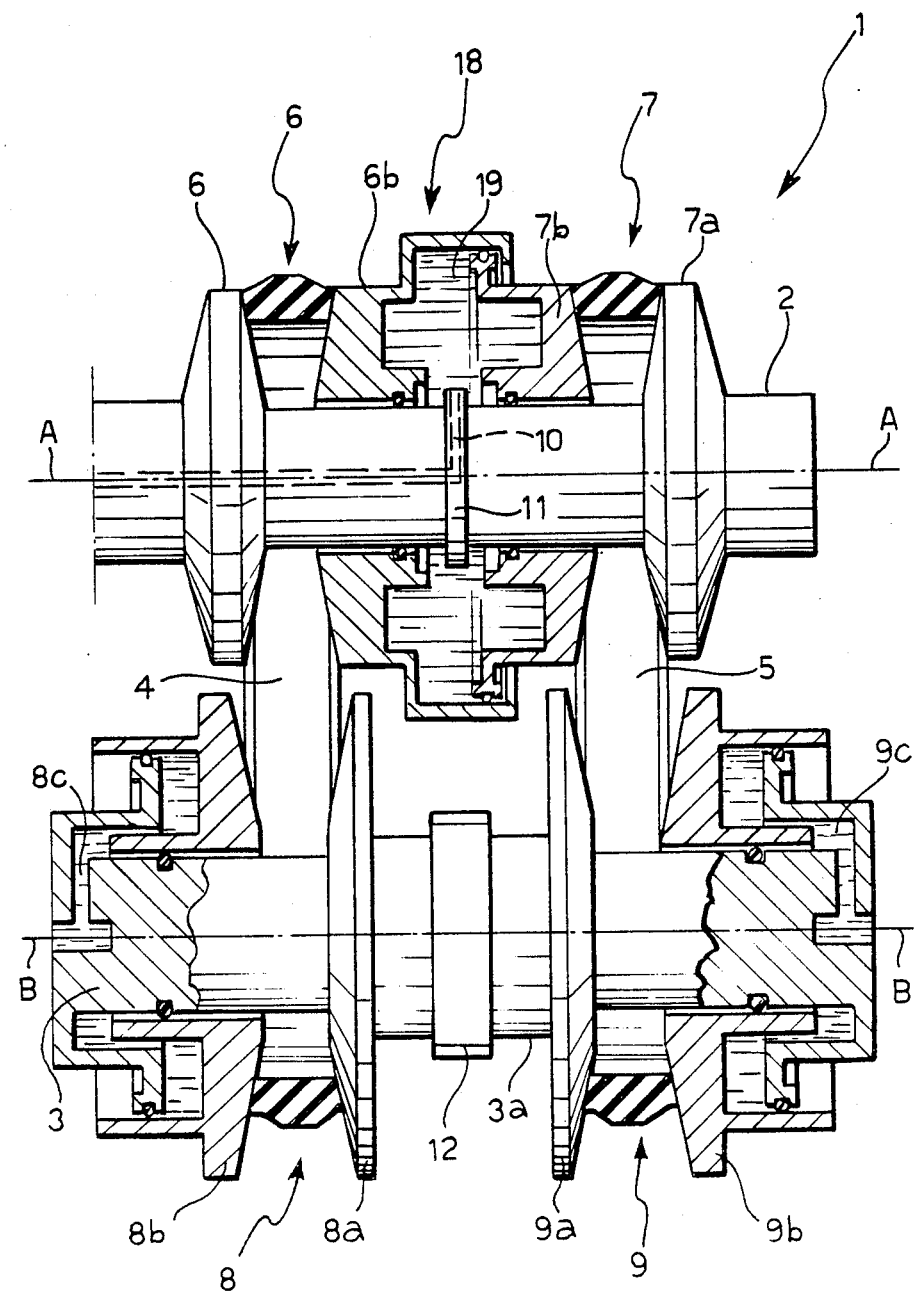
FIG. 2 is a view similar to FIG. 1, with the variator in a second operative condition.

FIG. 1 shows the configuration of the variator 1 which corresponds to the lowest transmission ratio, with the two driving pulleys 6, 7 in their configuration of maximum expansion and the drive pulleys 8, 9 in their condition of maximum contraction, whilst FIG. 2 shows the configuration of the highest transmission ratio, with the driving pulleys 6, 7 in their condition of maximum contraction and the driven pulleys 8, 9 in their condition of maximum expansion.

The use of a double driving belt 4, 5 enables the variator 1 according to the invention to be used for motor vehicles provided with very powerful power units, such as, for example, sports and racing cars. The conformation of the movable half-pulleys 6b, 7b of the two driving pulleys 6, 7 on the axially floating body 18 ensures automatic adaptation and self-adjustment of the transmission ratio of the variator 1, any slight dimensional differences of its components and, in particular, of the length of the two driving belts 4 and 5 being taken up.

Furthermore, the generally compact and symmetrical configuration of the variator 1 enables its bulk to be reduced, so that it can be used even where the available space is restricted.

Naturally the details of construction and forms of embodiment may be varied widely with respect to those described and illustrated, without thereby departing from the scope of the present invention.

Thus, for example, according to a possible variant, not illustrated, the toothed output member 12 could be arranged beside one or other of the driven pulleys 8 and 9 instead of between these pulleys.

I claim:

1. A continuous speed variator with expandable pulleys comprising a driving shaft, a driven shaft disposed parallel to said driving shaft, first and second expandable drive pulleys located on said first shaft, each of said first and second pulleys having a fixed half-pulley and a movable half-pulley movable relative to said fixed half-pulley with the movable half-pulleys of said drive pulleys being disposed between said fixed half-pulleys and forming parts of a single expandable and contractible body which is freely supported on said first shaft for movement between said fixed half-pulleys, first and second expandable driven pulleys located on said second shaft, first and second driving belts entrained about said first drive and driven pulleys and said second drive and driven pulleys respectively and hydraulic means for causing displacement of said movable half-pulleys for causing displacement of said movable half-pulleys for continuous variation of the speed ratio.

2. A variator according to claim 6 wherein the movable half-pulleys of the two driving pulleys are coupled to each other telescopically and define an intermediate thrust member which is connected to the hydraulic means.

3. A variator according to claim 1 wherein the driving shaft carries radial stop means for limiting the amount of axial sliding of the expandable and contractible body.

4. A variator according to claim 1 wherein said first and second expandable driven pulleys each have a fixed half-pulley and a movable half-pulley movable relative to said fixed half-pulley with the fixed half-pulleys of the two driven pulleys disposed between their movable half-pulleys and define between the driven pulleys an intermediate axial portion of the driven shaft which is aligned with the expandable and contractible body in a direction parallel to the driving belts and carries a toothed output member.

* * * * *